United States Patent
Tartamella et al.

(10) Patent No.: US 7,040,431 B2
(45) Date of Patent: May 9, 2006

(54) FUEL CELL HYBRID VEHICLE WITH AUTOMATICALLY WATERED AQUEOUS BATTERIES

(75) Inventors: Thomas J Tartamella, Oakland Township, MI (US); Doanh T Tran, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 155 days.

(21) Appl. No.: 10/643,033

(22) Filed: Aug. 18, 2003

(65) Prior Publication Data

US 2005/0039958 A1    Feb. 24, 2005

(51) Int. Cl.
B60K 6/00    (2006.01)

(52) U.S. Cl. .................... 180/65.1; 180/65.2; 180/68.5; 429/13; 429/17; 429/63; 429/64; 137/260; 137/261

(58) Field of Classification Search .............. 180/65.1, 180/65.2, 68.5; 429/13, 17, 63, 64; 137/260, 137/261
See application file for complete search history.

(56) References Cited

U.S. PATENT DOCUMENTS

| | | | |
|---|---|---|---|
| 1,471,048 A * | 10/1923 | Menger | ................... 137/261 |
| 4,522,896 A | 6/1985 | Iseard | |
| 5,453,334 A | 9/1995 | Melichar | |
| 6,213,145 B1 | 4/2001 | Crook et al. | |
| 6,338,368 B1 | 1/2002 | Hassell | |
| 6,491,120 B1 | 12/2002 | Ogburn | |
| 6,540,035 B1 | 4/2003 | Nagano et al. | |
| 6,580,977 B1 | 6/2003 | Ding et al. | |
| 6,727,011 B1 * | 4/2004 | Suzuki et al. | ................... 429/9 |
| 6,770,186 B1 * | 8/2004 | Rosenfeld et al. | .......... 205/343 |
| 6,845,839 B1 * | 1/2005 | Chernoff et al. | ............ 180/291 |
| 6,847,127 B1 * | 1/2005 | Lee | ........................ 290/40 C |
| 2004/0131926 A1 * | 7/2004 | Jones | ........................ 429/64 |

FOREIGN PATENT DOCUMENTS

| | | |
|---|---|---|
| EP | 0 474 003 A2 | 8/1991 |
| EP | 0 438 477 B1 | 6/1995 |
| EP | 0 721 228 A1 | 10/1996 |
| JP | 4-306557 | * 10/1992 |
| WO | WO 90/04188 | 4/1990 |

* cited by examiner

Primary Examiner—J. Allen Shriver
Assistant Examiner—Cynthia F. Collado
(74) Attorney, Agent, or Firm—Ralph E. Smith

(57) ABSTRACT

A fuel cell hybrid vehicle utilizing flooded aqueous battery or batteries operatively coupled to a fuel cell stack, an electric drive motor, and an integrated watering system, the integrated watering system comprising: a heat exchanger configured to extract water from exhaust air from the fuel cell stack; a reservoir, operatively connected to store the water; a sensor, operatively connected to generate a signal based on the flooded aqueous batteries' electrolyte level; a pump, operatively connected to the reservoir and the flooded aqueous batteries; and a system controller, operatively connected to receive and evaluate the signal from the sensor and actuate the pump to move water from the reservoir to the flooded aqueous battery or batteries.

14 Claims, 1 Drawing Sheet

FUEL CELL HYBRID VEHICLE WITH AUTOMATICALLY WATERED AQUEOUS BATTERIES

FIELD OF THE INVENTION

This invention relates to a hybrid electric vehicle using fuel cells and aqueous batteries that are automatically watered. More specifically, the present invention is directed to a completely integrated and maintenance free hybrid vehicle employing fuel cells, aqueous batteries, and a watering system for the aqueous batteries.

BACKGROUND OF THE INVENTION

There is no denying the ease and efficiency an electric vehicle represents. Electric motors are efficient and quiet. Batteries can be recharged when diurnal demands on the grid are lowest. An electric vehicle is essentially off when idle, and then seamlessly back on again when needed. Required maintenance is minimal. And electric vehicles emit no exhaust of any form.

But there are drawbacks to pure electric vehicles. Batteries are heavy and have a relatively low energy density compared to liquid fuels. Electric vehicles have a relatively limited range (from 30–200 miles). Recharging the batteries, the equivalent of refueling, is very slow and may require 8–12 hours for a discharged battery to be fully recharged. While electric powered vehicles have excellent torque capabilities and good acceleration, they generally lack the ability to cruise efficiently at high speed.

Hybrid vehicles that use both a gasoline and an electric motor are an ideal way to take advantage of the best qualities of gasoline and electric powered vehicles. Generally, hybrids are configured so that a gasoline engine powers the wheels directly, and/or powers a generator to produce electricity that powers the electric motor directly or is stored in the batteries. The gasoline engine, the electric motor, and the batteries can all be downsized resulting in a significant weight reduction. Depending on the desired vehicle performance, efficiency, etc, the gasoline and electric engines may be sized and configured to run singly or together depending on a number of factors. Such hybrid vehicles and their control strategies are disclosed in U.S. Pat. Nos. 6,540,035 B2, and 6,491,120 B1, the contents of which are specifically incorporated by reference herein.

A newer type of hybrid vehicle combines a high efficiency fuel cell with an electric motor and a battery pack. Fuel cell hybrids essentially provide two sources of electricity for a main drive electric motor: the fuel cell stack and electricity stored in the batteries. Fuel cell hybrids have a number of advantages over gasoline hybrids such as very few moving parts and significantly reduced or no emissions. Fuel cell hybrids are discussed in U.S. Pat. No. 6,580,977 B2, for example, the contents of which are specifically incorporated by reference herein. Some consider them superior to gasoline hybrids. Fuel cell hybrids like internal combustion hybrids are designed so that the battery pack is recharged as the vehicle operates (using current generated from operation of the fuel cell and/or current generated via braking, etc.), thus eliminating the need to "plug in" the battery to recharge it.

Like electric vehicles, battery technology is a limiting factor for hybrid vehicles as well. The solution to this problem involves cost and performance tradeoffs. At the high end of the cost scale are maintenance free (i.e. sealed, starved electrolyte), high energy density, and long life batteries. At the other end of the cost scale are non-maintenance free (i.e. watered, liquid electrolyte), lower energy density, and short lived batteries. The most useful batteries are obviously ones that are somewhere between these the two extremes, that is batteries that have reasonable energy density that are not too expensive.

The number of possible mid-range choices, however, has been limited by the necessity of using maintenance free batteries. This is because requiring the regular addition of water or pre-mixed electrolyte to flooded cells is fraught with difficulties. Some examples of potential problems are the following: 1) Both acid and base electrolyte (depending on battery chemistry) are dangerous chemical solutions and the necessity of regularly adding water or electrolyte to such solutions carries an increased risk of significant harm. 2) Improper addition of water electrolyte could destroy a battery pack, a $1,500 to $7,000 replacement cost. And, 3) required regular watering destroys the "maintenance free" aspect of a hybrid vehicle.

SUMMARY OF THE INVENTION

One object of the present invention is a fuel cell hybrid vehicle having an automated watering system that makes flooded batteries as maintenance free as sealed batteries. Another object of the invention is fuel cell hybrid vehicle having a watering system that is fully integrated and designed to function seamlessly with a fuel cell stack.

These and other objects are satisfied by a fuel cell hybrid vehicle utilizing flooded aqueous batteries operatively coupled to a fuel cell stack, an electric drive motor, and an integrated watering system, the integrated watering system comprising: a heat exchanger configured to extract water from exhaust air from the fuel cell stack; a reservoir, operatively connected to store the water; a sensor, operatively connected to generate a signal based on the flooded aqueous batteries' electrolyte level; a pump, operatively connected to the reservoir and the flooded aqueous batteries; and a controller, operatively connected to receive and evaluate the signal from the sensor and actuate the pump to move water from the reservoir to the flooded aqueous batteries.

DETAILED DESCRIPTION

Figure 1:
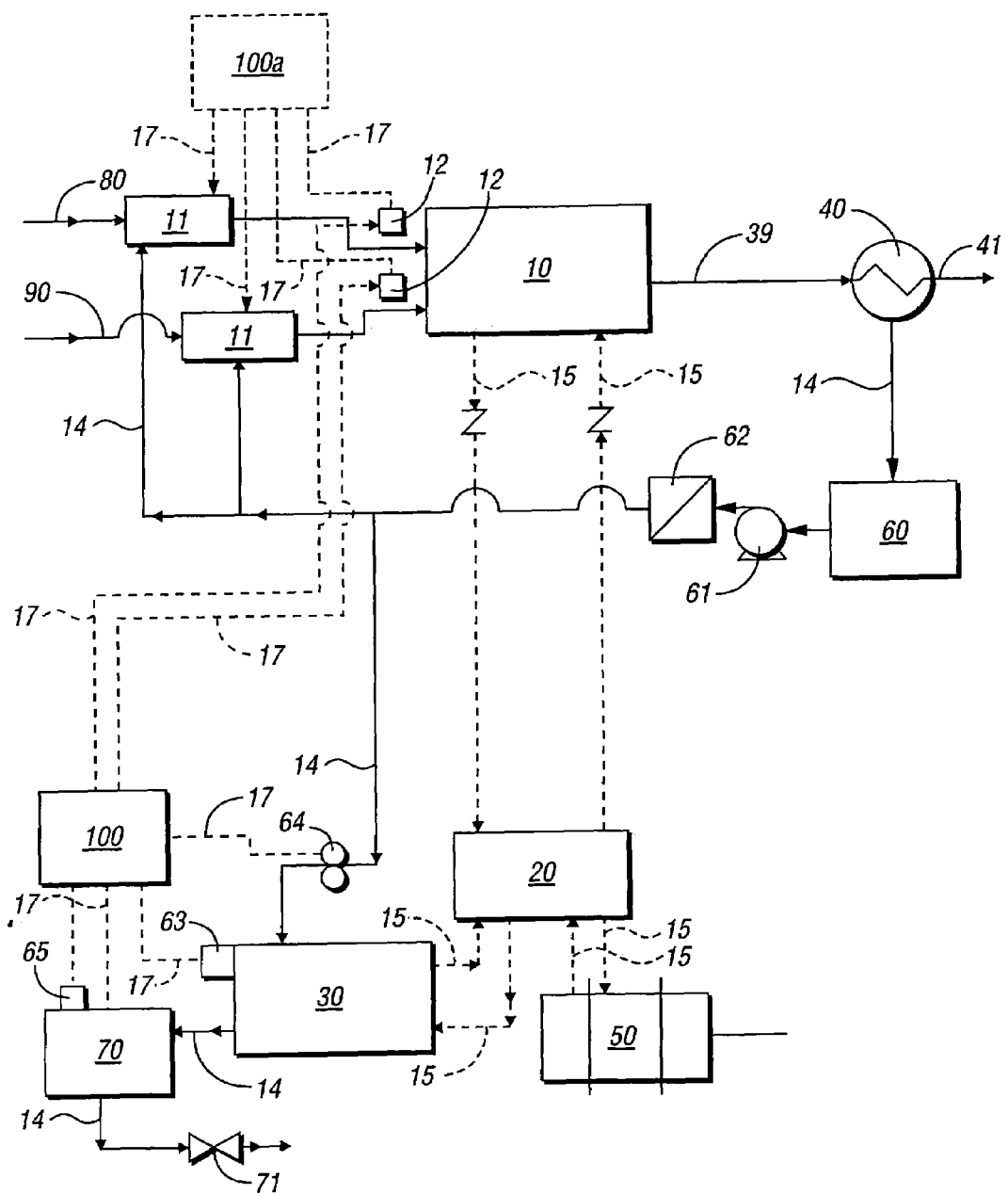
FIG. 1 is a schematic view of a hybrid fuel cell vehicle having an integrated flooded electrolyte battery watering system according to the present invention.

The use of flooded aqueous batteries for propulsion in electric and hybrid vehicles has been almost abandoned due to the necessity of constantly watering such batteries. Sealed, so called maintenance free, batteries, particularly those that are "starved" or designed to function with a minimal quantity of electrolyte are generally more expensive and shorter lived than flooded cells. By solving the watering problem, the present invention makes it possible to use flooded aqueous batteries and thus yields a reduction in cost and an increase in reliability over time. The present invention can be used with any aqueous chemistry battery such as nickel-iron, nickel cadmium, nickel hydroxide, and lead acid.

The present invention makes use of the pure water that is a natural byproduct of fuel cell operation. This water is generated on the cathode side of a fuel cell and carried out of the cell via the exhaust air. By using a heat exchanger (or similar method) this water is extracted from the exhaust air and stored in a reservoir. By coupling this reservoir to a pump, electrolyte level sensor, and control mechanism, water can be automatically provided to maintain the desired electrolyte level. In addition, this water is also used for humidifying the hydrogen (fuel) and the air (oxidant).

FIG. 1 is a non-limiting illustration of the present invention that shows a fuel cell hybrid vehicle and integrated watering system comprising a fuel cell stack 10, a voltage converter 20, traction batteries 30, a heat exchanger 40, and an electric drive motor 50.

More specifically, the fuel cell stack 10 has a hydrogen input line 80 and an air input line 90. In the fuel cell stack 10, hydrogen is oxidized in the presence of air to produce an electric current and water vapor. The electric current is transmitted via electrical lines 15 to the converter 20.

The converter 20 may be any type of current/voltage converter desired, such as a DC/DC converter or a DC/AC converter that converts the voltage from high to low or low to high depending on the specifics of the individual system (these requirements can be based on the type of drive motor 50, the overall voltage and chemistry of the battery pack 30, as well as other vehicle equipment such as pumps, controllers, etc.). In addition, while the converter 20 is illustrated as connected directly to the traction batteries 30, it may be more convenient to connect an additional converter (not shown) in the lines 15 between the converter 20 and the battery 30.

The battery 30 in the present invention may be a single battery having multiple cells, or a battery pack or packs. As used herein, the term "battery" is intended to refer to all these possibilities. The battery may be operated at any convenient voltage.

The water vapor resulting from the oxidation of the hydrogen fuel in the fuel cell stack 10, flows out of the stack in the exhaust air via a wet exhaust air line 39. The wet exhaust air line 39 is coupled to a heat exchanger 40. The heat exchanger 40 cools the wet exhaust air and dries it by condensing the water vapor. Condensed water vapor is captured in a reservoir 60 and dried air flows out of the heat exchanger 40 via the dry air line 41.

The electric drive motor 50 is connected through the converter 20 to the battery 30 and the fuel cell 10. (All types of motors and connection and control strategies for the drive motors are considered part of the present invention.) Depending on the system configuration, desired performance, operator input (stopping, accelerating, cruising, . . . ), etc. the motor 50 may draw current directly from the battery 30, directly from the fuel cell 10, or from both the battery 30 and the fuel cell 10.

The integrated watering system of the present invention involves a water reservoir 60, a water pump 61, a de-ionizing filter 62, an electrolyte level sensor 63, diastolic pump 64, and a system controller 100. As discussed above, the water level in the water reservoir 60 is maintained with condensate from the fuel cell stack 10. The pumps 61, 64, and the de-ionizing filter 62 may be located at any convenient point along the water lines 14. The electrolyte level sensor 63 may be any known type of level sensor such as optical, electronic, mechanical, or a combination thereof. The system controller 100 may be configured to only control the watering system, to control other vehicle systems and the watering system, or to control and integrate all the vehicle systems. In operation, when the electrolyte level sensor(s) 63 returns a signal to the system controller 100 via signal connections 17, the system controller actuates the pumps 61, 64 (via control connections not shown) to draw an appropriate amount of water from the reservoir 60, de-ionize it via the de-ionizing filter 62, and add this water to the battery 30 to bring the electrolyte level/concentration to the desired level. Additionally illustrated in FIG. 1 are humidifiers 11 and an overflow reservoir 70. The humidifiers 11 are connected to the water reservoir 60 and placed to permit the addition of water vapor to the hydrogen stream 80 and the air stream 90 by drawing de-ionized through water line 14 from the reservoir 60. (The addition of water vapor increases the efficiency of the oxidation of the hydrogen fuel in the fuel cell stack.) Operation of the humidifiers 11 may be monitored by appropriate moisture sensors 12 and controlled by the system controller 100 or other controller(s), such as optional second controller 100a. Controllers 100, 100a alternatively are intergrated.

Alternatively, the system controller may be programmed to periodically actuate the pumps 61, 64 to draw water from the reservoir 60 until a signal from the sensor 65 located on the overflow reservoir 70 indicates overflow coming from the pack 30. Such a configuration is particularly convenient if the battery 30 is a battery pack made up of a plurality of batteries having fluid connections between each battery in the pack because it permits monitoring electrolyte level with a single sensor.

While electrolyte overflow from the battery 30 is not anticipated, some overflow might occur due to temperature variations, etc. Because such overflow would involve discharge of potential dangerous acid or base electrolyte, an overflow reservoir 70 is provided to capture such overflow. Preferably, the overflow reservoir has a connection 17 to the system controller 100 that monitors the level of the reservoir 70 and notifies the user if/when the overflow reservoir 70 needs to be emptied via the reservoir valve 71.

Although the invention has been described with reference to specific embodiments thereof, the forms of the invention shown and described are a non-limiting embodiment and various changes and modifications, such as described herein as well those that are obvious to those skilled in the art, may be made without departing from the spirit and scope of the invention as defined in by the Claims below.

The invention claimed is:

1. A fuel cell hybrid vehicle utilizing at least one flooded aqueous battery operatively coupled to a fuel cell stack, an electric drive motor, and an integrated watering system, said integrated watering system comprising:

a heat exchanger configured to extract water from exhaust air from said fuel cell stack;

a reservoir operatively connected to store said water;

an electrolyte sensor operatively connected to generate an electrolyte level signal based on said at least one flooded aqueous battery's electrolyte level;

a pump operatively connected to said reservoir and said at least one flooded aqueous battery;

moisture sensors, operatively connected to generate moisture level signals based on moisture levels for hydrogen gas and air input lines into said fuel cell:

at least one humidifier, operatively connected to said reservoir and said hydrogen gas and air input lines: and a controller operatively connected to receive and evaluate said electrolyte level signal from said electrolyte sensor and said moisture sensors to receive and evaluate said moisture level signals, to actuate said pump to move water from said reservoir to said at least one flooded aqueous battery and to actuate said at least one humidifier.

2. The fuel cell hybrid vehicle and integrated watering system of claim 1, said integrated watering system further comprising:
a deionizer, operatively connected between said reservoir and said at least one flooded aqueous battery.

3. The fuel cell hybrid vehicle and integrated watering system of claim 1:
wherein said controller comprises a system controller for receiving and evaluating said electrolyte level signal and actuating said pump, and
a second controller, operatively connected to receive and evaluate said moisture level signals from said moisture sensors and actuate said humidifiers.

4. The fuel cell hybrid vehicle and integrated watering system of claim 1, where said at least one flooded aqueous battery is of a type chosen from the group consisting of: nickel metal hydride, nickel iron, nickel cadmium, and lead acid.

5. The fuel cell hybrid vehicle and integrated watering system of claim 1, said integrated watering system further comprising:
an overflow reservoir operatively connected to said at least one aqueous battery.

6. A fuel cell hybrid vehicle utilizing at least one flooded aqueous battery operatively coupled to a fuel cell stack, an electric drive motor, and an integrated watering system, said integrated watering system comprising:
a heat exchanger configured to extract water from exhaust air from said fuel cell stack;
a reservoir operatively connected to store said water;
a pump operatively connected to said reservoir and said at least one flooded aqueous battery;
a system controller operatively connected to said pump to periodically control pumping of water from said reservoir via said pump to said at least one flooded aqueous battery;
an overflow reservoir operatively connected to receive overflow from said at least one flooded aqueous battery; and
a sensor on said overflow reservoir operatively connected to detect a change in fluid level in said overflow reservoir.

7. The fuel cell hybrid vehicle and integrated watering system of claim 6, said integrated watering system further comprising:
a deionizer, operatively connected between said reservoir and said at least one flooded aqueous battery.

8. The fuel cell hybrid vehicle and integrated watering system of claim 6, said integrated watering system further comprising:
moisture sensors, operatively connected to generate signals based on moisture levels for hydrogen gas and air input lines into said fuel cell;
humidifiers, operatively connected to said reservoir and said hydrogen gas and air input lines; and
a second controller, operatively connected to receive and evaluate said signals from said moisture sensors and actuate said humidifiers.

9. The fuel cell hybrid vehicle and integrated watering system of claim 8, wherein said system controller and said second controller are integrated.

10. The fuel cell hybrid vehicle and integrated watering system of claim 6, wherein said at least one flooded aqueous battery is of a type chosen from the group consisting of: nickel metal hydride, nickel iron, nickel cadmium, and lead acid.

11. A fuel cell hybrid vehicle utilizing at least one flooded aqueous battery operatively coupled to a fuel cell stack, an electric drive motor, and an integrated watering system, said integrated watering system comprising:
a heat exchanger configured to extract water from exhaust air from said fuel cell stack;
a reservoir operatively connected to store said water;
an electrolyte sensor operatively connected to generate an electrolyte signal based on said at least one flooded aqueous battery's electrolyte level;
a pump operatively connected to said reservoir and said at least one flooded aqueous battery;
a system controller operatively connected to receive and evaluate said electrolyte signal from said electrolyte sensor and to actuate said pump to move water from said reservoir to said at least one flooded aqueous battery;
moisture sensors, operatively connected to generate moisture level signals based on moisture levels for hydrogen gas and air input lines into said fuel cell;
humidifiers, operatively connected to said reservoir and said hydrogen gas and air input lines; and
a second controller, operatively connected to receive and evaluate said moisture level signals from said moisture sensors and actuate said humidifiers.

12. The fuel cell hybrid vehicle and integrated watering system of claim 11, where said system controller and said second controller are integrated.

13. A fuel cell hybrid vehicle utilizing at least one flooded aqueous battery operatively coupled to a fuel cell stack, an electric drive motor, and an integrated watering system, said integrated watering system comprising:
a heat exchanger configured to extract water from exhaust air from said fuel cell stack;
a reservoir operatively connected to store said water;
a pump operatively connected to said reservoir and said at least one flooded aqueous battery;
a system controller operatively connected to said pump to periodically control pumping of water from said reservoir via said pump to said at least one flooded aqueous battery;
a sensor on said overflow reservoir operatively connected to detect a change in fluid level in said overflow reservoir;
moisture sensors, operatively connected to generate signals based on moisture levels for hydrogen gas and air input lines into said fuel cell;
humidifiers, operatively connected to said reservoir and said hydrogen gas and air input lines; and
a second controller, operatively connected to receive and evaluate said signals from said moisture sensors and actuate said humidifiers.

14. The fuel cell hybrid vehicle and integrated watering system of claim 13 wherein said system controller and said second controller are integrated.

* * * * *